SOLID-STATE ELECTRICAL COMPONENT WITH CAPACITANCE DEFEATING RESISTOR ARRANGEMENT

Original Filed Aug. 31 1965

INVENTORS
Robert Swart
Irving Berlin
BY R. Smith
ATTORNEY

United States Patent Office 3,544,925

Patented Dec. 1, 1970

3,544,925

SOLID-STATE ELECTRICAL COMPONENT WITH CAPACITANCE DEFEATING RESISTOR ARRANGEMENT

Robert Swart, Newtown, and Irving Berlin, Bridgeport, Conn., assignors to Vitramon, Incorporated, Monroe, Conn., a corporation of Delaware Continuation of application Ser. No. 484,036, Aug. 31, 1965. This application Nov. 29, 1968, Ser. No. 781,693

Int. Cl. H03h 7/06; H03g 3/07, 3/28

U.S. Cl. 333—70 7 Claims

ABSTRACT OF THE DISCLOSURE

The present invention relates to a multielement electronic circuit component. More particularly the present invention relates to a component having a series of capacitors arranged in a stacked, one-on-top-of-the-other arrangement and a resistor arranged along the side of the component having its major surface perpendicular to the major surfaces of the conductive layers of the capacitors.

This is a continuation of Ser. No. 484,036 filed Aug. 31, 1965, now abandoned.

This invention relates to a solid-state electric circuit component comprising a laminate body of miniature or subminiature size provided with electric terminals for installation particularly in electronic circuits.

Specifically the present improvements concern an improved construction of such laminate comprising electrode layers supported and separated by different strata of a monolithic body of dielectric and interconnected electrically so as to operate as a plurality of capacitors functioning in a built-in network that includes one or more resistors or other noncapacitive forms of impedance.

In solid-state components having a resistor combined with a plurality of capacitors it has been proposed that the resistor be incorporated in the component so that it bridges a gap occurring between the electrode layers of two capacitors. In such combination the capacitors have usually consisted of electrode layers having their broadside faces separated by a stratum of the dielectric substance. It has been proposed that the gap be bridged substantially in the plane of one of the electrode layers by some low resistance material such as a cermet. Since, in order to function as a capacitor, the next closest electrode layer must have its broadside face in quite close proximity to the broadside face of the electrode layer that is interrupted by the resistor bridged gap, it has been found that a capacitive reaction can take place between a resistor so located and the most proximate other electrode layer of the capacitor when such electrode layer is separated from the resistor by only a thin stratum of dielectric.

It is an object of this invention to avoid undesirable capacitive effect of the kind mentioned by resorting to a different way of physically associating the resistor with the electrode layers of the capacitors.

A particular object is so to incorporate a resistor with the electrode layers of a capacitor such that no edgewise break nor gap is required in the areal continuity of any electrode. By the present improvement the full capacitive effect of the complete areas of laminated electrode layers can be had in a component of size not appreciably larger than that of the areas of the electrode layers themselves.

A further object is to provide an electrical component in which the aforesaid electrode layers of a plurality of capacitors are laminated in vertically separated groups, all electrode layers of all groups being confined to a single column of the superimposed electrode-layers.

These and other objects of the improvements will be evident in further detail from the following description of a successful embodiment of the principle of the invention having reference to the appended drawing wherein.

Figures 1, 2, 3, 4, 5, 6, 7:
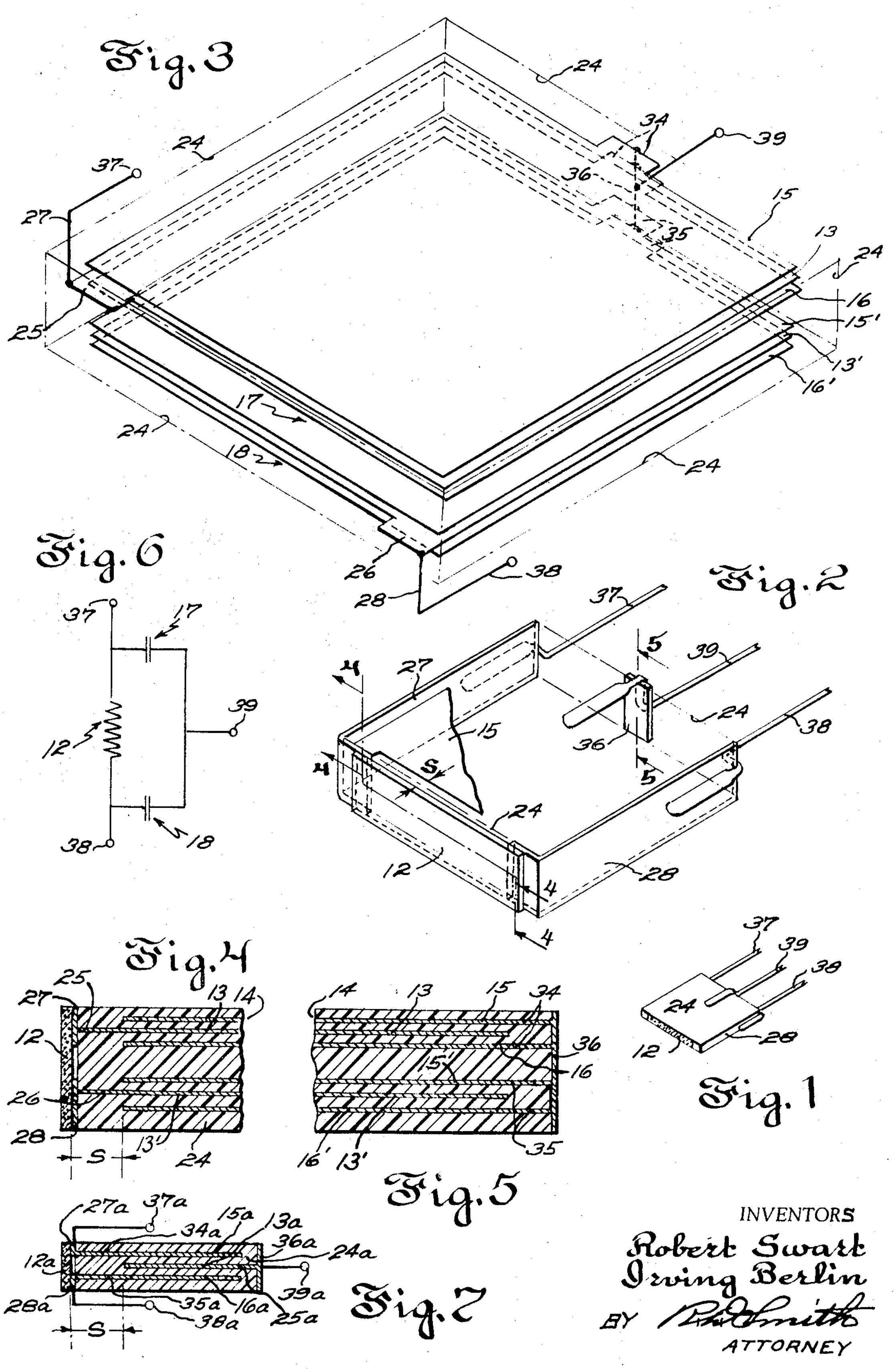
FIG. 1 is a perspective view of an electrical component embodying the invention shown in a practical size.
FIG. 2 is a corresponding view drawn on an enlarged scale with the dielectric body of the component omitted better to expose in skeleton form only the electrically conductive hardware with which the laminate body of the component is equipped.
FIG. 3 is a perspective view drawn on a still larger scale showing only the physical shapes and arrangement of the grouped electrode layers of the capacitors, boundaries of the body of dielectric being represented by dot-dash lines.
FIG. 4 is a still further enlarged view taken in section on the plane 4—4 in FIG. 2 looking in the direction of the arrows.
FIG. 5 is a view on the same scale as FIG. 4 taken in section on the plane 5—5 in FIG. 2, looking in the direction of the arrows.
FIG. 6 is a schematic wiring diagram showing a circuit network equivalent of the improved solid-state component.
FIG. 7 shows a simplified version of an electric circuit component utilizing the principles of the invention.

The improved construction by means of which a resistor can be consolidated with groups of capacitor forming electrode layers in a solid-state component so as to avoid undesirable capacitive reaction between the resistor and a neighboring electrode layer is shown in FIGS. 4 and 5. Instead of bridging a gap, say at the location 14, in the planar extent of some electrode layer as has heretofore been proposed, the resistor 12 is seen to be disposed crosswise the edges of the electrode layers 13, 15, 16 of the upper group which form a capacitor 17, and also crosswise the edges of the electrode layers 13', 15, 16' of a lower group which form the separate capacitor 18. The thickness of the dielectric layer between the lowermost electrode layer 16 of capacitor 17 and the uppermost electrode layer 15' of capacitor 18 being sufficient to substantially deter any capacitive relation between these two electrodes so that there are two separate capacitors. This results in an ability to provide a dielectric filled space (S) as wide as may be desired between the resistor 12 and the nearest edges of electrode layers 15, 16, 15' and 16'. FIGS. 2 and 3 show a practical construction of solid-state electrical component utilizing this improved principle of resistor and electrode relationship.

In each of FIGS. 2 and 3 the external boundaries of a monolithic body of dielectric 24 are indicated by dot-dash lines. The shape and arrangement of the electrode layers 13, 15, 16 and 13', 15', 16' will be clear from FIG. 3 where intermediate electrode layers of each capacitor 17 and 18 are seen respectively to have tongues 25 and 26 at the corners thereof projecting from the main outlines of the electrode layer in a common direction toward the front edge of the component. Tongues 25, 26 are the only portions of the capacitor electrode layers 13, and 13' that reach into coincidence with the front boundary surface of the dielectric body 24. All other edges of electrodes 13 and 13' are embedded in and completely sealed off by the dielectric. Tongues 25 and 26 are in electrical contact with inward turned end portions respectively of two conductive strips 27 and 28 which lie against opposite side edges respectively of the dielectric body. Strips 27 and 28 may comprise foil or merely stripes of a conductive composition containing metallic particles painted, sprayed, stenciled or otherwise deposited on the boundary surface of dielectric 24.

Tongue 25 of electrode layer 13, is in contact with only conductive strip 27 while tongue 26 of electrode layer 13' is in contact with only the other conductive strip 28. The only electrical interconnection of the electrode layer 13 of capacitor 17 with the electrode layer 13' of capacitor 189 is through the aforesaid resistor 12 which bridges the gap there between and is applied along the front boundary surface of the dielectric body 24 by stenciling, painting, spraying or other appropriate method.

Each of the layers 15 and 16 of the capacitor 17 has a tongue 34 and each of electrode layers 15' and 16' of the capacitor 18 has a similar tongue 35, said tongues projecting outward from the main outlines of these electrode layers toward the rear boundary surface of the dielectric body. Tongues 34 and 35 are the only portions of electrode layers 15, 16, 15' and 16' that reach into coincidence with such rear boundary surface of the dielectric body 24. All other edges of these electrodes are embedded in and completely sealed off by the dielectric. Tongues 34 and 35 are in electrical contact with a common conductive strip or stripe 36 that extends crosswise the edges of electrode layers 15, 16, 15' and 16' and lies against the rear edge boundary surface of the dielectric body 24. Strip 36 may comprise conductive foil or merely a stripe of conductive composition like that of stripes 27 and 28 likewise applied.

To the conductive strips or stripes 27, 28 and 36 may be affixed by solder or other conventional form of attachment projecting electric terminals or leads 37, 38 and 39, respectively, that are suitable for attachment to external circuit lines for placing the impedances 12, 17 and 18 in selected pattern communication with components of outside circuitry. These terminals may directly outstand from the face of the component in respectively different directions, but herein are shown all to project from the component in a common direction, and beyond what has been referred to as the rear edge surface of the dielectric body 24.

As guide lines for practicing the invention in a component of relatively miniature size, the following specifications may be considered without being interpreted as in any way limiting the permissible departure therefrom within the coverage of the appended claims.

FIGS. 1 to 5, inclusive, represent the invention as incorporated in a component containing two capacitors each comprising a group of more, and possibly far more, than two electrode layers. FIG. 7 shows the same principles of the invention incorporated in a comparable component where one of the two capacitors comprises only a pair of electrode layers **15*a*–13*a* and the other capacitor comprises only the different pair of electrode layers 16*a*–13*a*, the electrode layer 13*a*** being common to both capacitors. The other elements of the component shown in FIG. 7 are designated by the same reference numerals as in FIGS. 1 to 6 with the subscript *a* and include tongues **25*a*, 34*a*, and 35*a* projecting to the boundary surfaces of the dielectric body 24*a*, conductive strips or stripes 27*a*, 28*a* and 36*a*, the resistor 12*a*, and the electric terminals or leads 37*a*, 38*a* and 39*a*. In FIG. 7 the dielectric space (S) is likewise present for the same purpose of preventing undesirable capacitive reaction between the resistor 12*a* and the electrode layer 13*a***.

In a component having capacitor ratings in a range between .01 mf. and 0.3 mf. and resistive ratings in a range between 10 ohms and 10 megohms, the three dimensions of the laminate body may total from .2" x .2" x .020" to 1" x 1" x .25" and the dielectric body 24 may be proportioned as a relatively thin slab or as a block of more chunky proportions or as an elongate prism. The electrode layers can be approximately .0005" thick and may be square, rectangular, round or of some other shape and slightly smaller in area than the corresponding dimensions of the dielectric body in which they are embedded. Any of the described groups of electrode layers may contain any desired multiple of the number of individual layers shown in the drawing depending on the capacitive ratings desired. The stripes 27, 28 and 36 need be no thicker than .001" nor wider than .020" and the same is true of the resistor 12.

The appended claims are directed to and intended to cover all variations from specification given herein which come within the principles of the invention as defined by a broad interpretation of the wording of the claims.

We claim:

1. A solid state electronic component comprising a columnar shaped monolithic body having two major surfaces and at least three minor surfaces, a plurality of layers of a dielectric material alternating with a plurality of electrode layers, the electrode layers being divided into at least a first group and a second group with each group having at least two layers, the layers of each group being divided into a first set and a second set, each of the layers comprising a single unitary veneer substantially conforming to and confined within the boundaries of the preceding dielectric material layer, each of the layers of the first set of each group having at least a portion thereof extending to and coinciding with a first minor surface of the monolithic body, each of the layers of the second set of the first group having at least a portion thereof extending to and coinciding with a second minor surface of the monolithic body, each of the layers of the second set of the second group having at least a portion thereof extending to and coinciding with the second minor surface of the monolithic body, a first conductive stripe electrically interconnecting the electrode layers extending to the first minor surface of the monolithic body; a second conductive stripe electrically interconnecting the second set of the first group of electrode layers; a third conductive stripe electrically interconnecting the second set of the second group of electrode layers, such that the first and second electrode groups comprise a first capacitor and a second capacitor, and an impedance element in strip form fixedly attached to the second minor surface of the component and in electrical communication with the second and third conductive stripes to electrically interconnect the second set of the first group of electrode layers and the second set of the second group of electrode layers.

2. A component as defined in claim 1 wherein the second and third conductive stripes each overlie a portion of the surface of the monolithic body which is coextensive with the electrode layers of the second set of the first group and the second set of the second group.

3. A component as defined in claim 1 wherein the impedance element overlies and is fixedly attached to at least a portion of the second conductive stripe.

4. A component as defined in claim 1 wherein the impedance element overlies and is fixedly attached to at least a portion of the third conductive stripe.

5. A component as defined in claim 1 wherein the impedance element is a strip of resistive material coated onto at least a portion of the second conductive stripe and at least a portion of the third conductive stripe.

6. A solid-state electronic component comprising a columnar-shaped monolithic body having a plurality of layers of a dielectric material alternating with a plurality of electrode layers, the alternating dielectric material layers and electrode layers being classified into a first capacitive set and a second capacitive set, the alternating dielectric layers and electrode layers comprising the first capacitive set overlying the alternating dielectric layers and electrode layers comprising the second capacitive set, the first capacitive set being separated from the second capacitive set by a mid-layer of dielectric material having its major surfaces oriented in a plane substantially parallel to the major surfaces of the electrode layers of the first and the second capacitive sets, the thickness of the mid-layers of dielectric material being sufficient to substantially deter a capacitive relationship between the lowermost electrode layer of the first capacitive set and the uppermost electrode layer of the second capacitive set, at least a portion of the edges of selected electrode layers of the first capacitive set and at least a portion of the edges of selected electrode layers of the second capacitive set extend to and correspond with the same face of the columnar-shaped monolithic body, a first conductive stripe adhering to the monolithic body and covering the exposed edges of the electrode layers of the first capacitive set to electrically interconnect the exposed electrode layers of the first capacitive set and a second conductive stripe adhering to the monolithic body and covering the exposed edges of the electrode layers of the second capacitive set to electrically interconnect the exposed electrode layers of the second capacitive set, an impedance element in strip form electrically interconnecting the first conductive stripe and the second conductive stripe to thereby electrically interconnect the exposed electrode layers of the first conductive set and the exposed electrode layers of the second conductive set.

7. An electronic component as defined in claim 6 wherein the impedance element comprises a strip of resistive material adhering to the first conductive stripe and the second conductive stripe.

References Cited

UNITED STATES PATENTS

| | | | |
|---|---|---|---|
| 1,671,478 | 5/1928 | Marbury | 333—70 |
| 1,865,137 | 6/1932 | Priess | 317—261 |
| 2,437,212 | 3/1948 | Schottland | 317—261 |
| 2,877,389 | 3/1959 | Wiener | 333—70X |
| 2,940,035 | 6/1960 | Lefkowitz | 333—70X |
| 3,086,150 | 4/1963 | Held | 317—261X |
| 3,223,905 | 12/1965 | Fabricius | 317—261X |
| 3,264,709 | 8/1966 | Lupfer | 317—261X |
| 3,266,121 | 8/1966 | Rayburn | 333—70X |
| 2,131,018 | 9/1938 | Scott | 317—261X |
| 3,390,012 | 6/1968 | Haberecht | 317—256X |
| 3,398,326 | 8/1968 | Swart et al. | 317—256X |
| 3,235,939 | 2/1966 | Rodriguez | 317—261X |

FOREIGN PATENTS

| | | | |
|---|---|---|---|
| 715,671 | 9/1954 | Great Britain | 333—70 |
| 574,510 | 3/1950 | Italy | 323—74 |

HERMAN KARL SAALBACH, Primary Examiner

W. H. PUNTER, Assistant Examiner

U.S. Cl. X.R.

317—101, 256, 261